Aug. 22, 1950　　　　A. M. HENRY　　　　2,519,571
COWL FASTENER
Filed April 22, 1944　　　　　　　　　　5 Sheets-Sheet 1
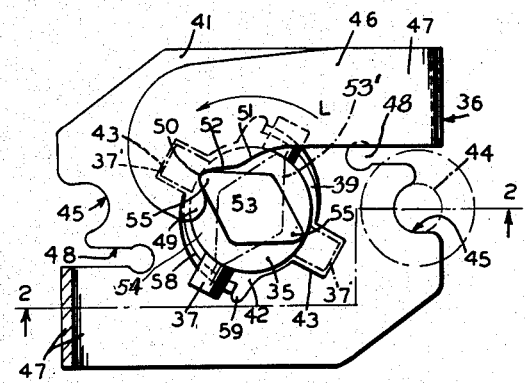
FIG. 1
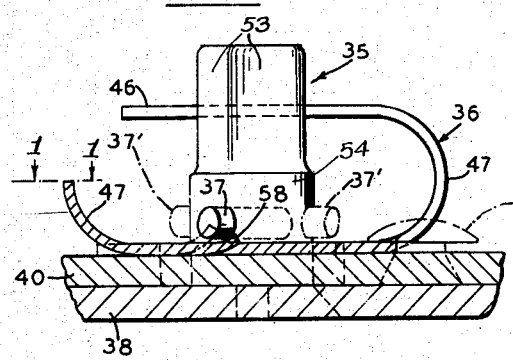
FIG. 2
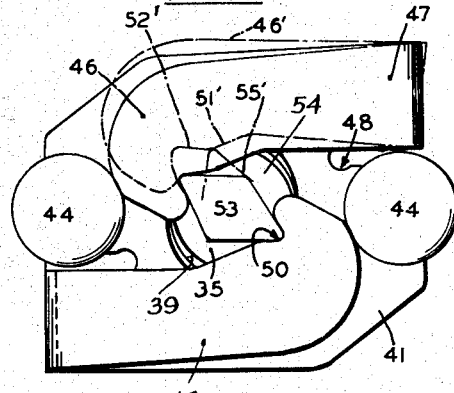
FIG. 3
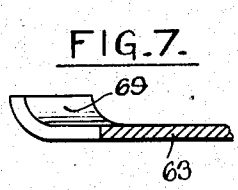
FIG. 7
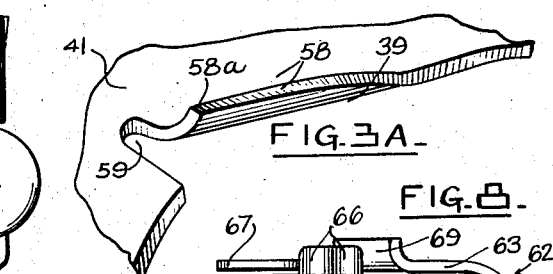
FIG. 5
FIG. 6
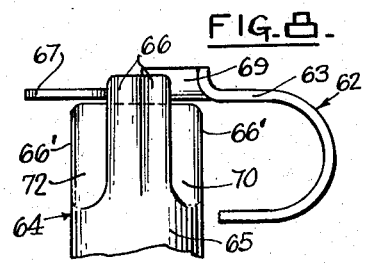
FIG. 3A
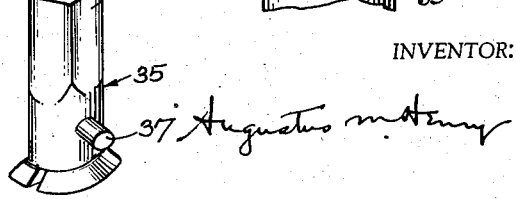
FIG. 8
FIG. 4
INVENTOR:
Augustus M. Henry Aug. 22, 1950  A. M. HENRY  2,519,571
COWL FASTENER Filed April 22, 1944  5 Sheets-Sheet 2

INVENTOR:

Augustus M Henry

Aug. 22, 1950   A. M. HENRY   2,519,571
COWL FASTENER

Filed April 22, 1944   5 Sheets-Sheet 3

INVENTOR.
Augustus M. Henry

Aug. 22, 1950 A. M. HENRY 2,519,571
COWL FASTENER
Filed April 22, 1944 5 Sheets-Sheet 5

*INVENTOR:*
Augustus M. Henry

Patented Aug. 22, 1950

2,519,571

UNITED STATES PATENT OFFICE 2,519,571

COWL FASTENER

Augustus M. Henry, Brooklyn, N. Y.

Application April 22, 1944, Serial No. 532,231

16 Claims. (Cl. 24—221)

This invention, like that of U. S. patent to me No. 2,276,694, granted March 17, 1942, relates to fasteners operative by the fractional rotation of a stud for the quick coupling of two parts, as an inner plate and an outer plate. The present invention is usable on airplanes, as one of its many fields of utility.

According to this invention, as in the case of the patent aforesaid, the part coacting with the stud is a receptacle including one or more substantially flat leafspring units, each herein called a swing-arm, and such swing-arm has a free or floating end, and a root end which merges into a substantially C-shaped loop, herein called a springing-loop. Also pursuant to the teaching of said patent, a spring-arm here is so supported that it is movable under applied force in various directions, but always elastically, and always with greatest and exceptionally high resistance to any displacement laterally of the flat of the arm due to the necessity for an accompanying distortion of the springing-loop.

According to said patent, the directly coacting parts of swing-arm and stud are, respectively, the free end or claw of the swing-arm, and a recess in the stud for receiving and retaining the claw, said recess including a channel which extends spirally of the stud-shank and has a cam element therein. However, when such a channel is used, cost of manufacture of the stud on a production basis has been found to be intolerably higher than anticipated, and too high for many fields of utility of the fastener.

An object of this invention is to provide an improved stud for improved coaction with the receptacle, and a stud so shaped that the same can be made at really trifling cost because fabricable at the rate of 300 per minute in a standard so-called rivet-making machine having merely two end-dies.

Another object is to provide an improved receptacle, and particularly one adapted to overcome a defect in the fastener of the patent aforesaid, by making it impossible to overlock the fastener, that is, to turn the stud in locking direction beyond locked position and so unintentionally leave the fastener unlocked.

Another object is to provide a fastener as above, in which some part of a swing-arm, other than its claw, coacts with the stud; to simplify the receptacle, reduce the cost of die-equipment for making the same, and prolong the useful life of the fastener.

Another object is to provide a readily lockable and unlockable fastener having the above advantages; and one wherein, with the receptacle riveted, welded or otherwise fixedly attached to the inner plate, mismatching of the stud-receiving holes in the inner and outer plates may be compensated for, by float of one fastener part relative to the other.

Another object is to provide an improved fastener and one involving the use with a fractionally rotatable stud of a swing-arm supported at one end on a substantially C-shaped springing loop pursuant to the patent aforesaid, but wherein the extremely powerful elastic action of such arm when moved to cause distortion of said loop is employed as a means for tightly drawing together the parts coupled by the fastener.

Various other objects, features and advantages of the present invention will be hereinafter pointed out or become apparent from the following description of various now approved embodiments of the invention as illustratively shown in the accompanying drawings.

In these drawings:

Fig. 1 shows one embodiment, partially in bottom plan and partially in section along 1—1 of Fig. 2; locked.

Fig. 2 is a section taken on line 2—2 of Fig. 1.

Fig. 3 shows the same fastener completely in bottom plan and illustrating in dot-and-dash lines certain changed positions of the parts incidental to operation.

Fig. 3A is an enlarged fragmentary perspective view, showing a part of the receptacle bottom.

Fig. 4 shows the stud in perspective.

Fig. 5 is a bottom plan view of another embodiment, locked.

Fig. 6 is a similar view, but showing the stud partially turned in locking direction to effect maximum lateral displacement of the swing-arms.

Fig. 7 is a detail view, showing a lip carried by a swing arm as such lip would be seen with said arm shown in section pursuant to the line 7—7 of Fig. 6.

Fig. 8, a fragmentary section taken substantially on line 8—8 of Fig. 6, shows the stud in side elevation.

Figure 8A:
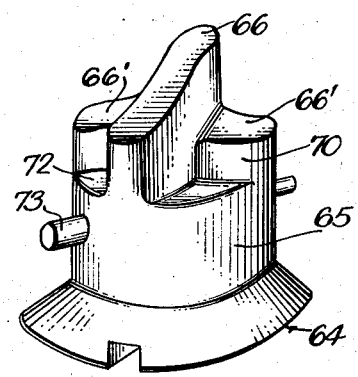

Fig. 8A shows the stud in perspective.

Figure 9:
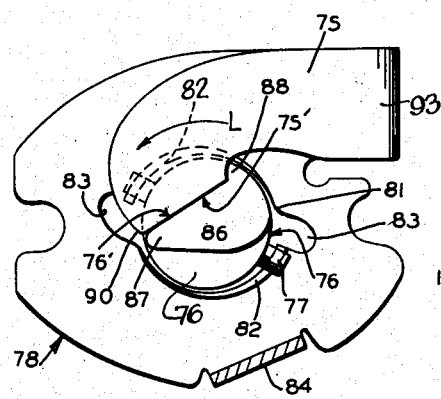
Figure 11:
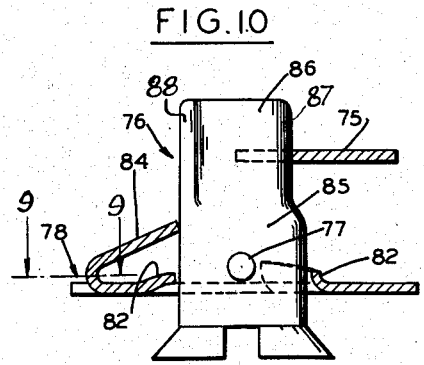

Fig. 9 illustrates another embodiment, locked, which view, mainly in bottom plan, shows one part in section pursuant to the line 9—9 of Fig. 11.

Figure 10:
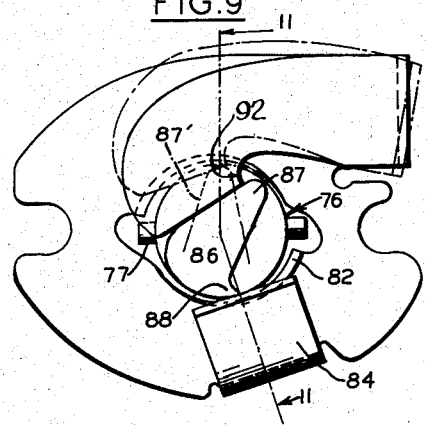

Fig. 10 shows said embodiment completely in bottom plan, but unlocked.

Fig. 11 is a section taken on line 11—11 of Fig. 10.

Figure 12:
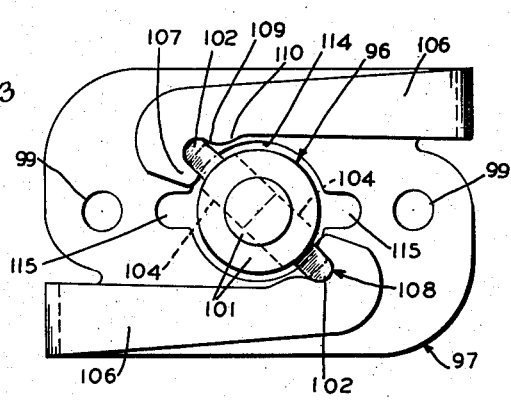

Fig. 12 shows another embodiment in plan, locked.

Figure 13:
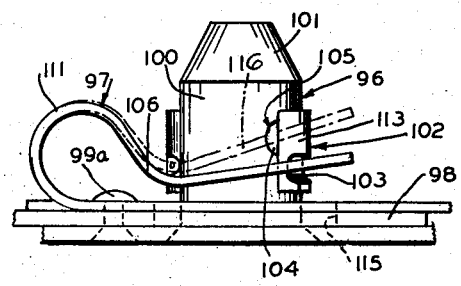

Fig. 13 is a fragmentary side elevation thereof, but showing the receptacle bottom riveted to the inner plate, and also showing the outer plate.

Figure 14:
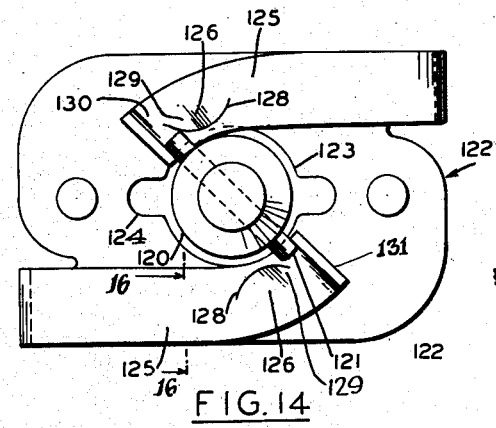

Fig. 14 is a bottom plan view of another embodiment, locked.

Figure 15:
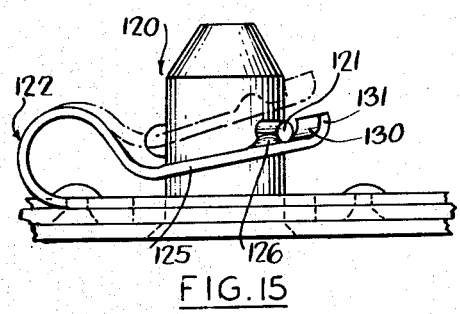

Fig. 15 is a view similar to Fig. 13, but in regard to the embodiment last-mentioned.

Figure 16:
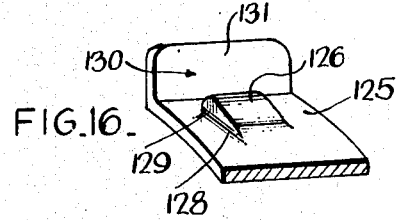

Fig. 16 is an enlarged section taken on line 16—16 of Fig. 14.

Figure 17:
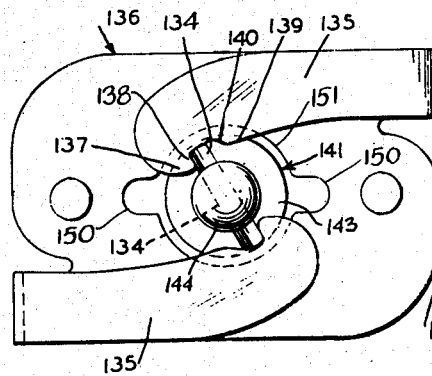

Fig. 17 is a bottom plan view of another embodiment, locked.

Figure 18:
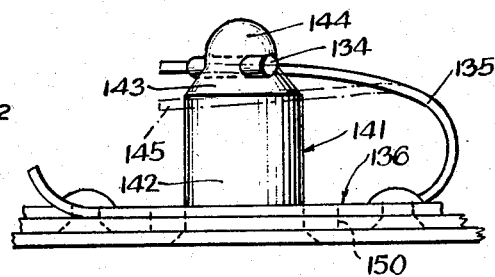

Fig. 18 is a view similar to Fig. 13, but showing the embodiment last mentioned.

Figure 19:
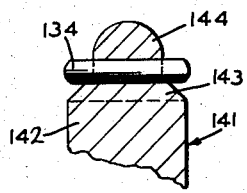

Fig. 19 is a detail axial sectional view of the upper portion of the stud of the fastener of Figs. 17 and 18.

Figure 20:
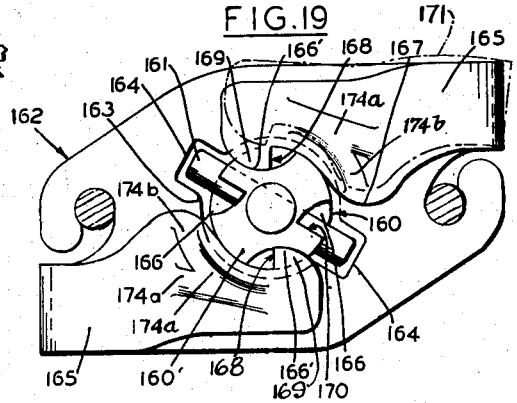

Fig. 20 is a bottom plan view of another embodiment, unlocked.

Figure 21:
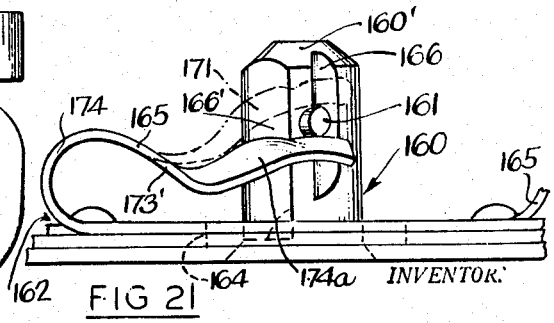

Fig. 21 is also a view similar to Fig. 13, but showing the embodiment last mentioned.

Figure 22:
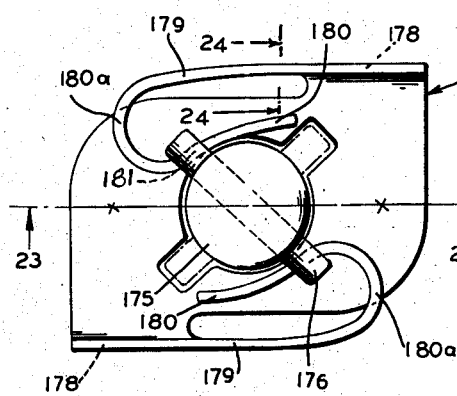

Fig. 22 is a bottom plan view of another embodiment, locked.

Figure 23:
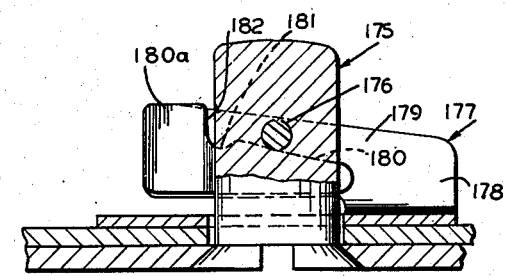

Fig. 23 is a section taken on line 23—23 of Fig. 22.

Figure 24:
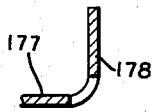

Fig. 24 is a detail section taken on line 24—24 of Fig. 22.

Figure 25:
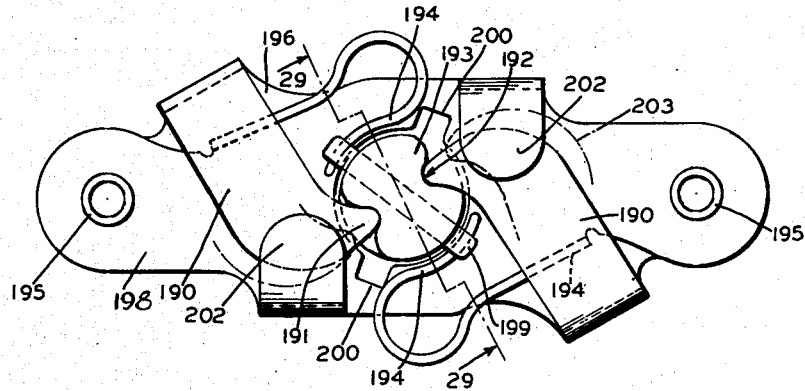

Fig. 25 is a bottom plan view of another embodiment, locked.

Figure 26:
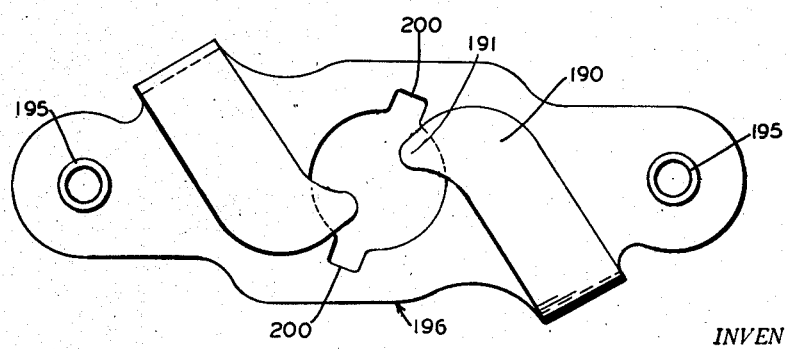

Fig. 26 is a bottom plan view showing one of the two receptacle units thereof.

Figure 27:
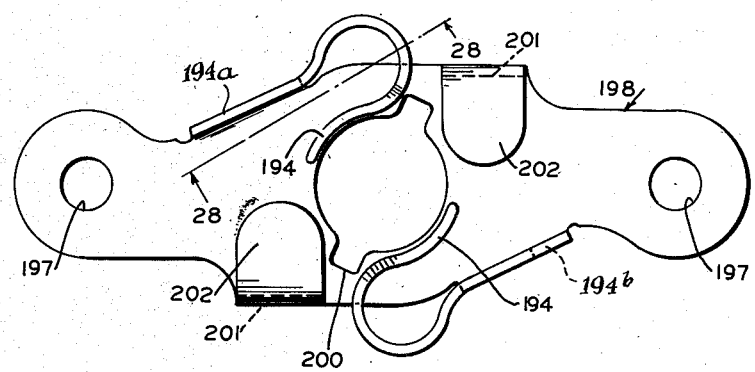

Fig. 27 similarly shows the other of said two receptacle units thereof.

Figure 28:
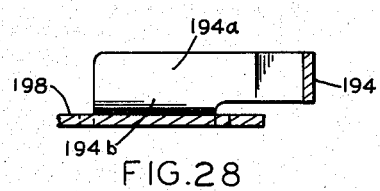

Fig. 28 is a detail section taken on line 28—28 of Fig. 25.

Figure 29:
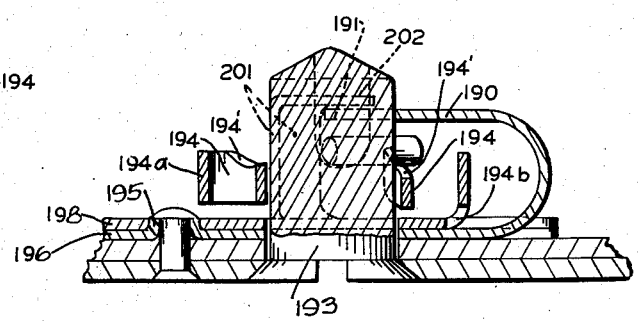

Fig. 29 is a section taken on line 29—29 of Fig. 25.

Referring to Figs. 1 thru 4, a stud 35, for coaction with a receptacle 36, carries a diametral cross-pin 37, inserted to force fit in the stud after the stud shank has been sent through an opening in an outer plate 38, thereby to mount the stud rotatably but non-detachably on said plate. An opening 39 is in an inner plate 40, and in the receptacle bottom 41 is an opening matching the opening 39; these two openings having extensions 43 for permitting passage therethrough of the pin-ends.

Fig. 1 has been called a bottom plan, because the parts are here shown as they would appear when viewed while looking toward the inner side of the inner plate 40—that is, while looking toward the side of the fastener opposite to that which would be seen while looking toward the outer side of the outer plate 38, in which case, of course, only the head of the stud would be visible.

Receptacle 36 is shown as riveted to inner plate 40 by rivets 44, the shanks of which are illustrated as semi-girthed by cut-outs 45, to reduce the size of the fastener. For instance, in the embodiment now being described, drawn on a scale four times actual size, as are all other embodiments illustrated where partial girthing of a rivet shank is shown, the over-all length of the fastener is merely ¾", and the width about ⅝". Such a tiny fastener has many uses, where relatively small stresses effective to act shiftingly on the receptacle as a whole are encountered.

Two swing-arms 46 are extended from springing-loops 47, the latter integral with the receptacle bottom 41 and partially alongside slots 48. Each swing-arm, at its free end, carries the bill 49 of a hook 50, and, at a side edge facing the stud, cam formations or what may be called reactors 51 and 52. Each cam 51 coacts with one of two projections 55 established by the opposite ends of a diamond-shaped top 53 of the studshank, to effect lateral sway of the swing-arms, during rotation of the stud 35 in the locking direction indicated at L in Fig. 1, and each cam 52 coacts with said ends 55, to effect lateral sway of the swing-arms, during rotation of the stud in the opposite direction, for unlocking.

The fastener is locked as shown in full lines in Fig. 3, by turning the stud through 90° in locking direction. During such stud rotation, the ends of pin 37 are correspondingly advanced from their dot-and-dash positions 37' (Fig. 1). On first insertion of the stud into the receptacle, the diamond 53 is arranged as shown in dot-and-dash at 53'; and on thereupon turning the stud in locking direction, the cams 51 coact with the diamond-ends 55 as above, until, as indicated in dot-and-dash at 55' in Fig. 3, the diamond is so positioned that its ends 55 are about to be transferred to the cams 52, coincidental with forcing of the swing-arms to their maximum lateral sway, as indicated in dot-and-dash at 46', thereby to relocate the cams 51 and 52 as indicated in dot-and-dash at 51' and 52'.

The fastener thereupon snaps into locked condition, with a single loud click, due to slapping of the diamond-ends 55 against the bills 49.

With the fastener thus locked, there is no possibility of overlocking, because of the relative location of each projection 55 (when in its hook 50) and the associated springing-loop 47. Actually, the more the stud is attempted to be turned further in locking direction, once it has been turned through 90° in that direction to effect locking, the more will both swing-arms tend to swing in toward each other at their free ends.

In various uses of a fastener of the stud and receptacle type, there is no need to draw the joint with the tightness required in attaching engine cowlings to air craft. Sometimes merely a non-rattle fit is desired; and for that, accurate machining of the parts may be relied on.

However, an exceedingly tight joint is afforded by the present invention; and in a simple and easy way, by providing means including the ends of the cross-pin 37 now familiar in the art for preventing accidental loss of the stud from the outer plate 38, and also including, for coaction with the ends of the cross-pin, two curvilinearly extending formations 58 hereinafter called tongues, formed up from the receptacle bottom and specially shaped as most clearly shown in Fig. 3A when examined in connection with Figs. 1 and 2.

When the fastener is locked, the ends of pin 37 are on the high ends 58a (Fig. 3A) of said formations; and according as the sum of the thicknesses of the plates 38 and 40 varies, the tongues 58 will be more or less elastically compressed. Said tongues have greatest elastic flexibility adjacent their ends 58a, because of the shape of the tongues 58 and the provision of cut-outs 59. As the tongues 58 are here shown, the loud click on locking above referred to does not occur, due to the fact that, with said tongues shaped as illustrated herein, that is, continuously upwardly ramped from roots to free ends, there is a friction drag on the ends of cross-pin 37 which is effective to prevent slapping of the projections 55 against the bills 49 incidental to turning the stud to locked condition.

Referring to the form of the invention illustrated in Figs. 5, 6, 7, 8, and 8A.

Here is shown a receptacle 62, with swing-arms

63; and a stud 64 is provided which has the upper end of its shank 65 shaped to include a transverse rib to provide at its ends a pair of projections 66 and a pair of projections 66' oppositely offset from the middle of the rib. The tops of the projections 66' are below the tops of the projections 66 as clearly shown in Fig. 8A.

Each swing-arm 63 has a terminal snout 67 partly bounded by a straight edge 68, which edge is part of the means for providing a hook cut-out 68' in the swing-arm. Said edge, as contradistinguished from a mere point as in my patent aforesaid, is not only spaced away from the free end of the swing-arm, but coacts with the stud, as later will be understood, so as to be subject to more of a slapping impact than a rubbing wear during locking and to be subject to no wear at all during unlocking.

Each swing-arm 63 carries a lip 69 upturned in the field of operation of the projections 66, the projections 66' being wholly below said field of operation. Consequent upon the provision of rib 66 and projections 66', four pockets are arranged around the stud; two pockets 70 in alternation with two pockets 72.

As in Fig. 1, the stud, 64, has a cross-pin, 73; and the receptacle 62 is provided with tongues 71, similar to the tongues 58 of Fig. 1.

*Operation.*—The cross-pin ends (these illustrated only in Fig. 5, to simplify the showing of Fig. 6) are positioned as indicated in broken lines, with the fastener locked; and are located as indicated in dot-and-dash at 73' when the stud has been inserted in the receptacle, just before fractional rotation of the stud, in counter-clockwise direction as seen in Figs. 5 and 6, for locking. Then the projections 66 are positioned in the location occupied in Fig. 5 by the projections 66', and then, therefore, each snout 67 is behind one of the projections 66 in the said direction of stud rotation for locking.

On turning the stud in that direction, the projections 66, by moving along the lips 69 of the swing-arms, force the latter to maximum lateral sway, against very high resistance due to the relatively close spacing of the rib ends from the springing-loops of the swing-arms.

Fig. 6 shows the ends of the projections 66 just after having left the lips 69, to allow snap of the snouts 67, with a single loud click, into the pockets 70, and the entry of the projections 66 into the hook cut-outs 68', thereby to lock the fastener.

In unlocking, the projections 66 sweep in the reverse direction against lips 69, thus forcing the swing-arms to maximum separation, and so clearing all parts of the swing-arms from all parts of the stud to an extent to permit stud rotation in unlocking direction, until the ends of cross-pins 73 again return to normal position coincidental with return of the swing-arms to normal resilient set, so that the stud may be removed from the receptacle.

Referring to the embodiment of Figs. 9 thru 11: Here the receptacle has a single swing-arm 75 provided with a flat 75' for coacting with the flat 76' of a stud 76, for holding the stud in locked condition; the stud having a cross-pin 77.

The receptacle is marked 78.

This fastener is substantially a half-turn one. Around the stud-shank receiving hole 81 in the receptacle bottom, are joint-tightening tongues 82, similar to the tongues 58 of Figs. 1 and 3; and these, adjacent their high ends, are free by virtue of their contiguity to enlargements 83 of the hole 81 to permit insertion of the cross-pin ends into receptacle 78. To avoid advancing said ends far enough on locking the fastener, to have them reach the enlargements 83 for drop therethrough, the stud is rotated through somewhat less than 180° in travel from unlocked to locking position.

The receptacle has a spring-tongue 84 for bearing against the stud shank at its main body 85; above which body the stud has an end formation 86 generally triangular in horizontal section and incorporating a rounded nose 87 and a hook 88.

*Operation.*—On inserting the stud, the parts become arranged as in full lines in Fig. 10. On partial turning of the stud in locking direction causes the nose 87 to act cammingly against the flat 75' of the swing-arm 75, and said arm is forced to side-sway; and when this has proceeded far enough, beyond the broken line showing 87' of said nose, to have the latter clear a rounding 90 at the free end of the swing-arm, the same is relieved of its then established maximum tension, and snaps the flat 75' against the flat 76' of the stud's top formation 86, and, signalled by a loud click, the fastener is locked, as shown in Fig. 9.

This fastener, also, cannot be unlocked by inadvertent overlocking, as now hook-bill 88 is engaged with an edge marked 92 on the swing-arm extended substantially parallel with the centerline of flexure of the springing-loop 93 of the swing-arm.

In unlocking the fastener, the nose 87 acts cammingly against the flat 75' and the parts become rearranged as in Fig. 11, with the ends of cross-pin 77 in line with cut-outs 83.

Referring to the embodiment of Figs. 12 and 13: The stud is indicated generally at 96 and the receptacle at 97; the latter being shown as provided with rivet holes 99, and one of the applied rivets being shown at 99a in Fig. 13.

The stud shank 100, having here a conical top 101, is provided with a cross-pin equivalent constituted by a pair of bifurcated pins 102, each presenting a fork 103, integral with a short cylindrical tang 104, force-fitted into a diametral hole 105 drilled through the main body 100 of the stud shank.

Receptacle 97 carries a pair of swing-arms 106, each having a terminal bill 107, beyond a hook 108, which hook is beyond cam elements 109 and 110. Each swing-arm 106, within its pear-shaped springing-loop 111, descends rather sharply, and then rises upward gradually toward the bill 107, thereby providing a normally gently ascending ramp 112 for being resiliently acted on by the upper tine 113 of a pin 102 for forcing the swing-arm down toward the receptacle bottom following interception of the swing-arm by the fork 103 incidental to partial turning of the stud in locking direction.

At 114 and 115, respectively, are indicated a main hole and oppositely located enlargements thereof in the receptacle bottom, for passage of the stud-shank and the pins 102.

*Operation.*—In Fig. 13, the stud is shown as having been turned sufficiently for the forks 103 to have seized the swing-arms and forced them down, from their dot-and-dah positions 116 to which they are normally biased, to their stud-locking positions as indicated in full lines in the case of the swing-arm 106 seen in Fig. 13. During passage of the throats of the forks 103 over the cams 110, the swing-arms are forced laterally of their flats to separation under tension. After these throats pass the crest marking the joinder of cams 109 and 110—without the forks losing their grasp on the swing-arms, as said throats are deeper than the said crest is high along a line radially of the stud, the stud becomes latched against retrograde turning and locked against overlocking, by the parts snapping to the condition shown in Fig. 12, accompanied by a loud click.

In unlocking, the fork throats bear against cams 109, to force the swing-arms 106 again to lateral sway; and then the forks ride down along the swing-arms toward their springing-loops 111, until the stud and receptacle clear as pins 102 are turned to register with enlargements 115 of opening 114 in the receptacle bottom.

Referring to the embodiment of Figs. 14 thru 16:

Here are shown a stud 120 having a conical top and a cross-pin 121 at a point so elevated on the stud-shank as not directly to act for joint tightening; and a receptacle 122 having its stud-shank passing hole 123 provided with oppositely disposed enlargements 124.

Each swing-arm 125 has formed thereon an upstanding projection 126 shaped to present, relative to an end of cross-pin 121, a pair of cam elements 128 and 129 merging at a nose facing the stud axis. Beyond each projection 126 a lock-pocket 130 is afforded for an end of cross-pin 121, just ahead of an upturned anti-overlock wall 131 at the free end of the swing-arm.

The construction just described is a modification of the embodiment of Figs. 12 and 13 in that each swing-arm 125 is shaped as shown in Fig. 15 to provide an upwardly extending ramp beyond the springing-loop; the stud here engaging the swing-arms by the pin-ends riding over the swing-arms incidental to the concluding half of stud rotation in locking direction.

The parts are shown in locked condition in full lines, while in Fig. 15 the normal set of a swing-arm is shown in dot-and-dash.

Referring next to the embodiment of Figs. 17 thru 19:

Here are shown a pair of swing-arms 135 carried by a receptacle 136 each swing-arm including a terminal bill, a hook and two cams, marked respectively 137, 138, 139 and 140; and a stud 141 having a shank 142 capped by a conical portion 143 merging into a top dome-shaped portion 144 through the base of which extends a relatively short cross-pin 134.

*Operation.*—To lock: With the cross-pin 134 extended substantially longitudinally of the receptacle bottom, the stud 141 is fully inserted to cause the dome 144 to force the swing-arms 135 to upward inclination as shown in full lines in the case of the swing-arm seen in Fig. 18, from its normal set as shown in dot-and-dash at 145, and then the stud is turned through about 120° in locking direction. During such turn of the stud, each cross-pin end first engages the stud-facing edge of the adjacent swing-arm and then rides along this edge until it reaches the cam 139. As said cam is traversed by said end, the swing-arm is forced away from the stud axis, moving down along the conical portion 143 of the stud, until said end snaps with a click into the hook 138, to signal that the fastener is locked.

To unlock: The stud is turned in unlocking direction, each end of the cross-pin now causing the cam 140 of the adjacent swing-arm to force that swing-arm outward as before, until said ends again extend between the two swing-arms. On withdrawing the stud, each swing-arm becomes restored to its normal set and lies as shown in dot-and-dash at 145 in Fig. 18.

This fastener of Figs. 17 thru 19 as here illustrated omits the usual cross-pin (as one of a length to pass at its ends through enlargements of the stud-shank hole 151 in the receptacle bottom), for preventing loss of the stud from the outer plate pursuant to the prior art, and for acting, as well, to draw the joint tight pursuant to the present invention. Such fastener, when not provided with the cross-pin last mentioned, is for use in certain structures to be assembled wherein an outer cover plate, not shown, is to be suitably drawn up to overlie the head of the stud after locking the fastener.

The purpose of dome 144 is, incidental to full insertion of the stud, to act shiftingly on one or the other of the swing-arms 135 which may be not precisely in the intended relation to the stud axis, as may be required where the stud-shank openings in the inner and outer plates are slightly out of registry.

It may be noted that various forms of the invention herein illustrated are arranged to permit compensation for mis-matched stud-shank holes through the outer and inner plates, without requiring, as in my previous patent aforesaid, that the receptacle be floatingly mounted on the inner plate.

For instance, in the case of the fastener of Figs. 17–19, where the stud-shank hole in the receptacle bottom, with the familiar enlargements 150, is shown at 151, it is merely necessary to have each hook 138 of a depth, relative to the high point between cams 139 and 140, which is the sum of the distances required for good locking (found to be feasible if as small as $3/64''$) and the distance required for radial float (say $\frac{1}{32}''$, as above), or a total of $5/64''$. By merely insuring this, and at the time having the pin 134 projected at each end beyond the dome 144 a corresponding amount ($5/64''$), the U. S. Army-Navy specified float ($\frac{1}{32}''$) is provided when the hole-enlargements 150 are properly elongated and the main opening 151 is (with say a ¼" stud), of a diameter of .260'' plus $\frac{1}{16}''$, instead of the usual .260''.

Referring to the embodiment of Figs. 20 and 21:

Here are shown a stud 160 having a truncated-cone top 160' and a cross-pin 161; and a receptacle 162 cut through at its bottom to provide a stud-shank opening 163 with the usual opposite enlargements 164, and carrying a pair of swing-arms 165.

While, as already stated, Fig. 20 shows the fastener unlocked, in Fig. 21 the fastener is shown locked.

The stud 160 longitudinally has a pair of oppositely located channels 166 of substantially quadrantal cross-section; and arranged in alternation with said channels 166 are a pair of oppositely located channels 166' of substantially semi-circular cross-section.

Each swing-arm has a cam 167. A straight edge 168 inside a terminal bill 169 on each swing-arm is provided for locking with a straight wall 170 of a pocket 166 when the fastener is locked, that is, when the stud has been turned through somewhat over 90° in locking direction from the position thereof shown in Fig. 20. On thus turning the stud, following full insertion thereof into the receptacle for preparatory entry of the bills 169 into pockets provided by the channels 166', the cam 167 and the cross-pin ends coact to force sway of the swing-arms outwardly, to permit the bills 169 to clear said pockets as indicated in dot-and-dash in Fig. 20, and so to permit turning of the stud to cause the cross-pin ends to ride over the upper surfaces of the swing-arms, which latter, including their springing-loops 174, are formed as to inclination and curvatures, respectively, generally like the corresponding parts in Figs. 12 and 13. Thereafter, during further turning of the stud, the cross-pin forces the swing-arms down and so places them under tension, until, when they are thus lowered from the positions indicated in dot-and-dash at 171 in Fig. 21, to their full line positions in Fig. 21, the bills 169 snap with a click into the pockets 166, to lock the fastener as above.

It is desirable to prevent elastic yield of a swing-arm at the bend indicated at 173' in Fig. 21, thereby to localize all such yield in the springing-loop 174. This is done by beading up the material of the spring-arm as indicated at 174a.

If, in addition, a branchiform beading is provided as at 174b, the bottom of each end of pin 161 will travel along the crest of beading 174b and then along the crest of a part of beading 174a, to give merely a point to point engagement between the pin ends and the swing-arm as the former move from the positions shown in dot-and-dash in Fig. 21, toward and to snap-lock into pockets 166, thus reducing frictional drag on the pin-ends and increasing the loudness of the click.

To consider next structures illustrative of arrangements as now favored for attaining another object of the invention:

That object is to provide improved fastening structures involving the use with a fractionally rotatable stud of a swing-arm supported on a springing loop pursuant to the aforesaid Patent 2,276,694 to me but wherein the extraordinarily powerful elastic action of such arm when stressed in a certain direction is utilized to make a tight-joint fastening by arranging the parts so that a line transverse to a swing-arm and facing the rotundity of its springing-loop is perpendicular to the general plane of the joint or at a considerable angle to that plane.

Referring to Figs. 22, 23 and 24, a stud 175 carrying a cross-pin 176 coacts with a receptacle 177 having a bottom apertured as usual for entry of the stud-shank and the ends of the cross-pin. Bent up from the diagonally opposite portions of this bottom are necks 178 each continued at its top by a laterally offset band-element long enough to be bent as shown, to provide a swing-arm-carrier 179, a swing-arm 180, and a springing loop 180a for the latter.

As shown best in Fig. 23, in the case of the swing-arm at the top of Fig. 22, each swing-arm, starting at its free end, ramps upwardly toward a lock-pocket 181 for an end of cross-pin 176, this pocket having a high far wall 182 to prevent over-locking.

The receptacle 177 provides prevised areas, as indicated at x, x, as for welding securement of the receptacle to the inner plate, or for rivet holes, or for use in any way to secure attachment of the receptacle, for instance, by prong formation for attachment to wooden as a plywood or the like type of inner plate or equivalent.

In Fig. 22 the fastener is shown in locked condition, while Fig. 23 shows the parts in process of being locked or unlocked, with the cross-pin ends ascending or descending, as the case may be, the ramps on the swing-arms.

Referring to the embodiment of Figs. 25 through 29:

Here two pairs of swing-arms are incorporated; those marked 190 each carrying a claw 191 for snap into a lock-pocket 192 on a stud 193, and those marked 194 operating according to the principles of the swing-arms of Fig. 22 except that, in view of the presence of swing-arms 190, swing-arms 194, while upwardly ramped at 194' (Fig. 29) to allow the cross-pin to coact therewith to draw the joint tight on stud rotation in locking direction, are not equipped with lock-pockets.

Each swing-arm 194 is on a carrier 194a on a neck 194b.

The cam operative relative to each swing-arm 194 is the ramp 194' of that swing-arm. This cam functions during stud rotation in locking direction, and also all the while the fastener is in locked condition.

The cam operative relative to each swing-arm 190 is its own curvilinear edge portion which partially establishes the claw 191. This cam functions during rotation of the stud in locking direction. A different cam, for coaction with each swing-arm 190 during stud rotation in unlocking direction, is afforded by the rounded nose of claw 191.

As will be noted, maximum tension of the joint-drawing means is attained at the instant of locking of the fastener.

A separate carrier for each pair of swing-arms is provided by a different stamping. These stampings, however, marked 196 (see particularly Fig. 26) and 198 (see particularly Fig. 27), are easily assembled by the manufacturer using the fastener in his product; because said stampings are readily interfittable. They have matching means whereby a total of two welding or riveting operations may secure both stampings properly and simultaneously in place to constitute and immovably anchor a single receptacle for the stud; such means, as facilitative of riveting, are shown as comprising a pair of holes each surrounded by a drawn up collar 195 in the underlying stamping 196 which carries swing-arms 190; and a pair of holes 197 in the overlying stamping 198 which carries swing-arms 194.

Both stampings have matching openings for passage into the receptacle of the shank of stud 193 and the ends of the latter's cross-pin 199; the cut-outs for the pin ends being seen at 200 in Figs. 25–27.

The stamping of Fig. 27 includes, in addition to its swing-arms 194, and the aforesaid associated parts 194a and 194b, a pair of inverted-L members each comprising a post-portion 201 and a restrictor plate 202, the latter to overlie the claw-carrying end portions of the swing-arms 190 of the other stamping as shown in Fig. 25. These are to restrict these swing-arms, in response to wedge-thrust of the conical top of the stud shank on forcing the stud to full insertion, from yielding the easy way, that is, by swinging upward. If this happens, the purpose of such cone will be defeated; which is to force the claws 191 to horizontal separation to the extent indicated in dot-and-dash at 203 in Fig. 25—thereby to permit the stud to be turned sufficiently in locking direction (a) to cause click-drop of each claw into one of the stud's lock-pockets 192, to lock the stud against retrograde turning, and (b) to ride the cross-pin ends up along the ramped surfaces of swing-arms 194, to draw the joint tight; all as best shown in Fig. 25.

The stamping of Fig. 26 is recommended to be of thinner stock than that used for the stamping of Fig. 27; for instance, using SAE 1065 spring steel, the former stamping could well be, for a fastener small enough to use a diameter of ¼" to 5/16" for the stud shank main body, of a thickness of the order of .015", as against a thickness for the other stamping of .028".

As will be understood, a few only of the many possible embodiments of the invention have been shown. They have been described with considerable particularity of detail, not for purposes of limitation, of course, but to illustrate the diverse capabilities of the present invention. As will further be understood, variations and modifications are possible, and parts of the improvements may be used without others.

Wherever in the appended claims, a twisting distortion of a springing-loop is referred to, there is meant a distortion thereof of the kind made clear by the foregoing detailed description of the various embodiments herein illustrated; that is, a distortion of said loop which involves not a mere contraction or expansion thereof, but which results from a sidewise movement of the supported swing-arm pursuant to the teaching of the aforesaid Patent 2,276,694 to me, as graphically shown at opposite side portions of Figs. 3 and 4 of that patent. And wherever in the claims the plane of flatwise or widthwise disposition of a swing-arm is referred to as at a considerable angle to the general plan of extension of the parts, such, for instance, as the plates illustrated at 38 and 40 in Fig. 1 hereof, to be joined by the fastener, there is meant that such swing-arm is arranged to lie flatwisely or widthwisely in a plane at an angle somewhere approximately between an angle of 45° and an angle of 90° to said general plane of extension. Wherever in said claims an element is mentioned as well removed from the free end of a swing-arm, there is meant a spacing of that end of such element adjacent to said free end, from said free end, which is great enough to prevent rubbing wear of said free end as a result of relative movement between the parts incidental to locking and unlocking the fastener.

I claim:

1. A fastener of the class described, including a receptacle incorporating a main basal sheet-like portion having an opening therethrough and also incorporating a plurality of elongate integral extensions with their directions of length arranged along opposite sides of a point approximately central relative to the area of said opening, said receptacle being of spring material and said arms being so biased as to be elastically maintained in normal relative adjacency, said extensions constituting a pair of swing arms extended in opposite directions and in sidewisely spaced relation, each of said arms merging at its root portion into a substantially C-shaped springing loop, such loop in turn merging into a marginal subdivision of said basal portion at opposite sides of the latter, each of said arms being of a width in a direction substantially parallel to the general plane of extension of said basal portion which is at least several times the thickness of the sheet material of which the receptacle is made, each of said arms adjacent to its free end being shaped for integrally presenting a hook-bill formation, the free ends of said bills being directed toward each other in a direction extending transversely of said opening.

2. A fastener as in claim 1, said receptacle including cam surfaces thereon, said fastener also comprising a headed stud insertable through said opening having means spaced from such head operative when the stud is turned in locking direction for engaging said cam surfaces for tending to cause axial movement of the stud, and a formation on the stud near the end thereof opposite to its headed end, the last-named formation including oppositely located projected end portions for engaging said hook-bill formations to limit rotation of the stud in locking direction.

3. A fastener as in claim 1, said receptacle including cam surfaces thereon, said fastener also comprising a headed stud insertable through said opening having means spaced from such head operative when the stud is turned in locking direction for engaging said cam surfaces for tending to cause axial movement of the stud, and a formation on the stud near the end thereof opposite to its headed end, the last-named formation including oppositely located flattened projected end portions for engaging said hook-bill formations to limit rotation of the stud in locking direction.

4. A fastener as in claim 1, said receptacle including cam surfaces thereon, said fastener also comprising a headed stud insertable through said opening having means spaced from such head operative when the stud is turned in locking direction for engaging said cam surfaces for tending to cause axial movement of the stud, and a formation on the stud near the end thereof opposite to its headed end, the last named formation including oppositely located projected end portions for engaging said hook-bill formations to limit rotation of the stud in locking direction.

5. A fastener as in claim 1, wherein said hook-bill formations extend in a direction substantially diametral of the stud and diagonal relative to the lengths of said arms.

6. A fastener as in claim 1, said receptacle including cam surfaces thereon, said fastener also comprising a headed stud insertable through said opening having means spaced from such head operative when the stud is turned in locking direction for engaging said cam surfaces for tending to cause axial movement of the stud, and a formation on the stud near the end thereof opposite to its headed end, the last-named formation including oppositely located projected end portions for engaging said hook-bill formations to limit rotation of the stud in locking direction, at least one of said arms having a hump spaced from its hook-bill formation in the direction toward its springing loop, said hump having a crest directed toward the other arm and hence adapted to act as a means operating cam-fashion to increase the elastically resisted distortion of said springing loop incidental to a turning of said stud in locking direction.

7. A fastener as in claim 1, said receptacle including cam surfaces thereon, said fastener also comprising a headed stud insertable through said opening having means spaced from such head operative when the stud is turned in locking direction for engaging said cam surfaces for tending to cause axial movement of the stud, and a formation on the stud near the end thereof opposite to its headed end, the last-named formation including oppositely located projected end portions for engaging said hook-bill formations to limit rotation of the stud in locking direction, said arms of the receptacle being so extended relative to said opening and so located relative to the axis of the stud when the stud is inserted through the opening that approximately the longitudinal center line of each arm, between the root portion of the bill of said arm's hook-bill formation and said arm's springing loop, passes through a point of rotative thrust of the stud's said formation against said hook-bill formation following full turning of the stud in locking direction, whereby, after the stud has been fully turned in said direction, any pull along said arm, effectuated by such a thrust incidental to an attempt to turn the stud further in said direction, is so extended relative to said center line that said pull tends rather to impart a tendency to said arm to swing toward the other arm than away from the latter.

8. A fastener as in claim 1, said receptacle including cam surfaces thereon, said fastener also comprising a headed stud insertable through said opening having means spaced from such head operative when the stud is turned in locking direction for engaging said cam surfaces for tending to cause axial movement of the stud, and a formation on the stud near its end opposite to its headed end, the last-named formation including oppositely located projected end portions for engaging said hook-bill formations to limit rotation of the stud in locking direction, said cam surfaces on the receptacle being carried by elastically displaceable subdivisions of said basal portion of the receptacle.

9. A fastener as in claim 1, said receptacle including cam surfaces thereon, said fastener also comprising a headed stud insertable through said opening having means spaced from such head operative when the stud is turned in locking direction for engaging said cam surfaces for tending to cause axial movement of the stud, and a formation on the stud near its end opposite to its headed end, the last-named formation including oppositely located projected end portions for engaging said hook-bill formations to limit rotation of the stud in locking direction, said cam surfaces on the receptacle being carried by elastically displaceable subdivisions of said basal portion of the receptacle, said surfaces being extended along the upper sides of the last-named subdivisions, each of said last-named subdivisions being arranged to partially circumferentially attend said opening.

10. A fastener as in claim 1, said receptacle including cam surfaces thereon, said fastener also comprising a headed stud insertable through said opening having means spaced from such head operative when the stud is turned in locking direction for engaging said cam surfaces for tending to cause axial movement of the stud, and a formation on the stud near its end opposite to its headed end, the last-named formation including oppositely located projected end portions for engaging said hook-bill formations to limit rotation of the stud in locking direction, the means on the stud for engaging said cam surfaces comprising the opposite ends of a cross-pin on the stud for permitting non-detachable coupling of the stud to that one of the two pieces to be coupled by the fastener other than the piece to which the receptacle is to be secured, said opening being shaped to allow passage therethrough of said opposite ends of the cross-pin as well as the shank portion of the stud.

11. A fastener as in claim 1, wherein said hook-bill formations extend in a direction substantially diametral of said opening and diagonal relative to the lengths of said arms.

12. A fastener as in claim 1, wherein at least one of said arms has a hump spaced from its hook-bill formation in the direction toward its springing loop, said hump having a crest directed toward the other arm.

13. A fastener of the kind described, including a headed stud, having a shank which over the major part of its length is substantially cylindrical, there being a cross-pin passed through said shank extending in a direction substantially perpendicular to the longitudinal center line of the shank, and having its opposite end portions both protruded beyond said shank for non-detachably coupling the stud to one of the two pieces to be coupled by the fastener, and a formation on the stud near the end thereof opposite to its headed end, said formation including oppositely located flattened projected portions.

14. A fastener as in claim 13, in which said formation is integral with the stud shank, and at the end of the stud opposite to its headed end, said formation being elongate substantially diametrally of the stud shank and having substantially uniplanar bounding wall surfaces at its opposite sides.

15. A fastener of the class described, including a receptacle incorporating a main basal sheet-like portion having an opening therethrough and also incorporating a plurality of integral extensions with at least one of said extensions constituting an elongate arm having its direction of length offset from a point approximately central to the area of said opening, said receptacle being of spring material and said extensions being so biased as to be elastically maintained in normal relative adjacency, said arm merging at its root portion into a substantially C-shaped springing loop, such loop in turn merging into a marginal subdivision of said basal portion, each of said extensions being of a width which is at least several times the thickness of the sheet material of which the receptacle is made, said fastener also comprising a headed stud insertable through said opening and carrying a formation near the end thereof opposite to its headed end, there being a detent means limiting rotation of the stud in locking direction including said formation and also including a shaped portion of said arm near the free end thereof.

16. A fastener as in claim 15, in which said receptacle includes integrally a cam means incorporating a cam surface rising from the side of said basal portion in the direction of rise therefrom of said springing loop, and in which the stud has means located therealong between its headed end and its said formation operative when the stud is turned in locking direction for engaging said cam means for tending to cause axial movement of the stud.

AUGUSTUS M. HENRY.

REFERENCES CITED

The following references are of record in the file of this patent:

UNITED STATES PATENTS

| Number | Name | Date |
| --- | --- | --- |
| 2,183,085 | Richardson | Dec. 12, 1939 |
| 2,276,694 | Henry | Mar. 17, 1942 |
| 2,307,004 | Murphy | Dec. 29, 1942 |
| 2,307,132 | Hufferd | Jan. 5, 1943 |
| 2,309,737 | Murphy | Feb. 2, 1943 |
| 2,322,614 | Bedford, Jr. | June 22, 1943 |
| 2,327,327 | Maynard | Aug. 17, 1943 |
| 2,329,909 | Johnson | Sept. 21, 1943 |
| 2,344,832 | Rosengren | Mar. 21, 1944 |
| 2,358,005 | Green | Sept. 12, 1944 |